United States Patent
Mouri et al.

(10) Patent No.: US 10,662,124 B2
(45) Date of Patent: May 26, 2020

(54) FERTILIZER COMPOSITION CONTAINING OXIDIZED GLUTATHIONE AND FERTILIZER ELEMENT FOR FOLIAR APPLICATION

(71) Applicant: Kaneka Corporation, Osaka (JP)

(72) Inventors: Taku Mouri, Hyogo (JP); Ken Uekita, Hyogo (JP); Toyoaki Watanabe, Hyogo (JP); Yu Fu, Hyogo (JP); Naoaki Taoka, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 15/861,291

(22) Filed: Jan. 3, 2018

(65) Prior Publication Data

US 2018/0127326 A1 May 10, 2018

Related U.S. Application Data (63) Continuation-in-part of application No. PCT/JP2016/069675, filed on Jul. 1, 2016.

(30) Foreign Application Priority Data

Jul. 3, 2015 (JP) .................. 2015-134539

(51) Int. Cl.
 C05F 11/10 (2006.01)
 C05G 1/00 (2006.01)
 (Continued)

(52) U.S. Cl.
 CPC ............ C05F 11/10 (2013.01); A01G 7/06 (2013.01); A01N 25/00 (2013.01); A01N 41/12 (2013.01);
 (Continued)

(58) Field of Classification Search
None
See application file for complete search history.

(56) References Cited

U.S. PATENT DOCUMENTS

2004/0035162 A1* 2/2004 Williams ............... C05B 17/00
 71/28
2010/0016166 A1 1/2010 Ogawa et al.
(Continued)

FOREIGN PATENT DOCUMENTS

EP 3257830 A1 12/2017
JP S51-045053 A 4/1976
(Continued)

OTHER PUBLICATIONS

International Search Report issued in International Application No. PCT/JP2016/069675; dated Aug. 2, 2016 (2 pages).
(Continued)

*Primary Examiner* — Wayne A Langel
(74) *Attorney, Agent, or Firm* — Osha Liang LLP (57) ABSTRACT

A fertilizer composition for application to leaves of a plant includes oxidized glutathione and one or more fertilizer components. A method for cultivating a plant includes applying oxidized glutathione and one or more fertilizer components to leaves of the plant. A fertilizer kit for application to leaves of a plant includes oxidized glutathione and a composition comprising one or more fertilizer components, wherein the glutathione and the composition in the fertilizer kit are separate from each other.

5 Claims, 3 Drawing Sheets

(51) Int. Cl.
*A01G 7/06* (2006.01)
*A01N 41/12* (2006.01)
*A01N 25/00* (2006.01)
*C05C 9/00* (2006.01)
*C05B 7/00* (2006.01)
*C05D 1/02* (2006.01)
*C05D 1/00* (2006.01)
*C05C 5/04* (2006.01)
*C05D 9/02* (2006.01)
*C05C 3/00* (2006.01)
*C05B 1/02* (2006.01)
*C05B 1/04* (2006.01)
*C05D 5/00* (2006.01)
*C05B 17/00* (2006.01)
*C05D 3/02* (2006.01)
*C05D 9/00* (2006.01)
*C05B 9/00* (2006.01)
*C05C 1/00* (2006.01)

(52) U.S. Cl.
CPC .............. *C05G 1/00* (2013.01); *C05B 1/02* (2013.01); *C05B 1/04* (2013.01); *C05B 7/00* (2013.01); *C05B 9/00* (2013.01); *C05B 17/00* (2013.01); *C05C 1/00* (2013.01); *C05C 3/00* (2013.01); *C05C 5/04* (2013.01); *C05C 9/00* (2013.01); *C05D 1/00* (2013.01); *C05D 1/02* (2013.01); *C05D 3/02* (2013.01); *C05D 5/00* (2013.01); *C05D 9/00* (2013.01); *C05D 9/02* (2013.01)

(56) References Cited

U.S. PATENT DOCUMENTS

| 2010/0242141 | A1 | 9/2010 | Ogawa |
| 2014/0121100 | A1* | 5/2014 | Habib ............ C05G 3/06 504/100 |
| 2014/0194371 | A1 | 7/2014 | Mouri et al. |
| 2014/0366440 | A1 | 12/2014 | Ogawa et al. |

FOREIGN PATENT DOCUMENTS

| JP | S63-225593 A | 9/1988 |
| WO | 2008/072602 A1 | 6/2008 |
| WO | 2009/063806 A1 | 5/2009 |
| WO | 2011/071114 A1 | 6/2011 |
| WO | 2013/002317 A1 | 1/2013 |

OTHER PUBLICATIONS

Extended European Search Report issued in European Application No. 16821338.7, dated Jan. 30, 2019 (8 pages).

* cited by examiner

Fig. 3

FERTILIZER COMPOSITION CONTAINING OXIDIZED GLUTATHIONE AND FERTILIZER ELEMENT FOR FOLIAR APPLICATION

TECHNICAL FIELD

One or more embodiments of the present invention relate to a fertilizer composition for application to leaves of a plant and a method for plant cultivation using the same.

BACKGROUND

Glutathione is a peptide consisting of three amino acids, i.e., L-cysteine, L-glutamic acid, and glycine. Glutathione is present in a wide variety of living organisms including not only humans but also other animals, plants, and microorganisms, and it is an important compound for living organisms that is involved in, for example, removal of active oxygen species, detoxification, and amino acid metabolism.

Glutathione is present in vivo in the form of either reduced glutathione (N—(N-γ-L-glutamyl-L-cysteinyl)glycine) in which the thiol group of the L-cysteine residue is reduced in the form of SH (hereafter, it may be referred to as "GSH") or oxidized glutathione in which the thiol group of the L-cysteine residue is oxidized to form a disulfide bond between two glutathione molecules (hereafter, it may be referred to as "GSSG").

GSSG is known to be useful in the field of, for example, fertilizers, pharmaceuticals, and cosmetic products.

Patent Document 1 discloses a technique involving the use of a GSSG-containing medium to promote the rooting of plant seedlings. Patent Document 1 also discloses that nitrogen, phosphorus, and potassium are further added to a GSSG-containing medium. Patent Document 1 further discloses that a GSSG solution is spray-applied to leaves of plant seedlings.

Patent Document 2 discloses that GSSG is useful as an active component of a plant growth regulator that increases the harvest index. For example, it has activity of increasing the number of seeds and the number of flowers of the plant or increasing the number of lateral shoots or tillers of a plant. Patent Document 2 also discloses that GSSG is sprayed to a plant's leaf surface for plant growth promotion.

PRIOR ART DOCUMENTS

Patent Documents

Patent Document 1: WO 2011/071114
Patent Document 2: WO 2008/072602
Patent Document 3: WO 2013/002317

GSSG had been known to promote plant growth. When GSSG was to be applied to soil, however, GSSG was easily lost in soil because GSSG was soluble in water.

Although GSSG may be applied to plant leaves, the activity of GSSG for plant growth promotion achieved by foliar application thereof was not satisfactory, and improvement in practical application thereof was required. Meanwhile, a technique for improving such activity of GSSG had not been provided in the past.

SUMMARY

One or more embodiments of the present invention improve the activity of GSSG for plant growth promotion in a technique for promoting plant growth via foliar application of GSSG.

The inventors of the present disclosure, surprisingly, found that applying a fertilizer element in combination with GSSG to plant leaves in the method of promoting plant growth caused the GSSG and the fertilizer element to act synergistically and provided a significantly enhanced plant growth promotion effect.

One or more embodiments of the present inventions are disclosed herein.

(1) A fertilizer composition for application to leaves of a plant, comprising GSSG and a fertilizer element ("fertilizer component").

(2) The fertilizer composition according to (1), wherein the fertilizer element comprises nitrogen ("nitrogen source"), phosphorus ("phosphorus source"), and potassium ("potassium source").

(3) The fertilizer composition according to (1) or (2), wherein the fertilizer composition exhibits a pH value of 2.0 to 6.5, when 3 g of the fertilizer composition is dispersed in 100 ml of distilled water at 25° C.

(4) A method for cultivating a plant comprising a step of application of GSSG and a fertilizer element to leaves of the plant.

(5) The method according to (4), comprising applying nitrogen, phosphorus, and potassium as the fertilizer element.

(6) The method according to (4) or (5), comprising applying oxidized glutathione and a fertilizer element to the leaves of the plant in the form of a fertilizer composition comprising the oxidized glutathione and the fertilizer element exhibiting a pH value of 2.0 to 6.5 when 3 g of the fertilizer composition is dispersed in 100 ml of distilled water at 25° C. or a diluent of the fertilizer composition.

(7) A fertilizer kit for application to leaves of a plant, comprising oxidized glutathione and a fertilizer element separately from each other.

(8) The fertilizer kit according to (7), wherein the fertilizer element comprises nitrogen, phosphorus, and potassium.

(9) Use of oxidized glutathione and a fertilizer element for application to leaves of a plant in cultivating the plant.

(10) The use according to (9), wherein the fertilizer element comprises nitrogen, phosphorus, and potassium.

(11) The use according to (9) or (10), wherein the oxidized glutathione and the fertilizer element are in the form of a fertilizer composition comprising the oxidized glutathione and the fertilizer element exhibiting a pH value of 2.0 to 6.5 when 3 g of the fertilizer composition is dispersed in 100 ml of distilled water at 25° C. or a diluent of the fertilizer composition.

Through application of the fertilizer composition according to (1) or (2) to leaves of a plant, the growth of the plant is promoted to a significant extent.

In the fertilizer composition according to (3), GSSG is maintained more stably, so that higher effects of growth promotion can be attained upon application thereof to plant's leaves.

According to the method of (4) or (5), plant growth is promoted to a more significant extent, compared with the case in which GSSG is applied to leaves and the fertilizer element is applied to the other parts, and compared with the case in which GSSG is applied to parts other than leaves and the fertilizer element is applied to leaves.

According to the method of (6), GSSG is maintained stably in the fertilizer composition, and higher effects of growth promotion can accordingly be attained.

Through application of components of the kit according to (7) or (8) to plant's leaves, plant growth can be promoted to a significant extent.

With the use according to (9) or (10), plant growth can be promoted to a significant extent.

According to the method of (11), GSSG is maintained stably in the fertilizer composition, and higher effects of growth promotion can accordingly be attained.

This description includes part or all of the content as disclosed in Japanese Patent Application No. 2015-134539, which is a priority document of the present application.

According to one or more embodiments of the present invention, the effects of GSSG for plant growth can further be enhanced in the technique of foliar application of GSSG, so as to promote plant growth.

DETAILED DESCRIPTION OF THE EMBODIMENTS

1. Oxidized Glutathione

Oxidized glutathione (GSSG) is a substance formed via a disulfide bond of two molecules of reduced glutathione (GSH, N—(N-γ-L-glutamyl-L-cysteinyl)glycine).

Oxidized glutathione (GSSG)

Various forms of oxidized glutathione (GSSG), such as free GSSG that is not bound to another substance and is not ionized (i.e., the form represented by the chemical formula shown above), a salt formed of GSSG and an acid or base, a hydrate thereof, and a mixture thereof, are within the scope of GSSG in one or more embodiments of the present invention. In addition, various forms of reduced glutathione (GSH), such as free GSH that is not bound to another substance and is not ionized, a salt formed of GSH and an acid or base, a hydrate thereof, and a mixture thereof, are within the scope of GSH in one or more embodiments of the present invention.

The fertilizer composition and the fertilizer kit according to one or more embodiments of the present invention or components applied to plants by the method according to one or more embodiments of the present invention may comprise reduced glutathione. In one or more embodiments, the content of oxidized glutathione in the fertilizer composition, fertilizer kit, or components is preferably larger relative to that of reduced glutathione. In one or more embodiments, it is more preferable that the fertilizer composition, fertilizer kit, or components comprise substantially no reduced glutathione. Further, the total mass of oxidized glutathione (wherein the mass is expressed in terms of its free form) is preferably 70% by mass or more, more preferably 80% by mass or more, further preferably 90% by mass or more, still further preferably 95% by mass or more, furthermore preferably 98% by mass or more, and most preferably 100% by mass, relative to the total mass of oxidized glutathione and reduced glutathione (wherein the mass is expressed in terms of their free forms) contained in the fertilizer composition, fertilizer kit, or components according to one or more embodiments of the present invention.

A GSSG salt is not particularly limited, provided that it is at least one salt acceptable as a fertilizer, such as an ammonium salt, a calcium salt, a magnesium salt, a sodium salt, or a lithium salt, and in one or more embodiments, it is preferably at least one salt selected from among an ammonium salt, a calcium salt, and a magnesium salt. As disclosed in Patent Document 3, an ammonium salt, a calcium salt, and a magnesium salt of GSSG in the solid state are low in deliquescence, easy to handle, and highly soluble in water. Thus, in one or more embodiments, such salts are particularly preferable. As described in Patent Document 3, such salts can be obtained in the solid form by heating GSSG to 30° C. or higher while keeping it in contact with an aqueous solvent selected from water and/or a water-soluble solvent in the presence of a substance capable of generating at least one type of cation selected from among the ammonium ion, the calcium cation, and the magnesium cation. The heating temperature is not particularly limited, provided that it is 30° C. or higher. In one or more embodiments, it is preferably 33° C. or higher, more preferably 35° C. or higher, and particularly preferably 40° C. or higher. While the upper limit is not particularly limited, for example, it is 80° C. or lower, preferably 70° C. or lower, and particularly preferably 60° C. or lower. In the case of industrial-scale production, a temperature range of 53° C. to 60° C. may be preferable. The aqueous solvent may be used alone or two or more solvents may be used in adequate combination. The use of water in combination with a water-soluble solvent is recommended. In such a case, water functions as a good solvent of oxidized glutathione and a water-soluble solvent functions as a poor solvent. In one or more embodiments, the volume of the water-soluble solvent is, for example, approximately 1 to 1,000 parts by volume, preferably approximately 5 to 500 parts by volume, further preferably approximately 10 to 100 parts by volume, and particularly preferably approximately 12 to 50 parts by volume, relative to 10 parts of water by volume. Examples of the water-soluble solvent that can be used include an alcohol (e.g., methanol, ethanol, propanol, butanol, and ethylene glycol) and a ketone (e.g., acetone and methyl ethyl ketone). Examples of GSSG salts obtained by such method include 1 ammonium salt of GSSG, a 0.5 calcium salt of GSSG, 1 calcium salt of GSSG, a 0.5 magnesium salt of GSSG, and 1 magnesium salt of GSSG.

2. Fertilizer Elements

The term "fertilizer element" (or "fertilizer component") used in the present disclosure generally refers to an element usable by plants, such as nitrogen, phosphorus, potassium, silicon, magnesium, calcium, manganese, boron, and iron. In one or more embodiments of the present invention, an organic compound or inorganic compound containing the element in the form usable by a plant can be used as a fertilizer element. It is preferable that the fertilizer element used in one or more embodiments of the present invention comprises at least one member selected from the group consisting of nitrogen, phosphorus, potassium, silicon, magnesium, calcium, manganese, boron, and iron. In one or more embodiments, it is more preferable that the fertilizer element comprises at least one member selected from the group consisting of nitrogen, phosphorus, and potassium. In one or more embodiments, it is particularly preferable that the fertilizer element comprises at least nitrogen, phosphorus, and potassium in combination.

As a fertilizer element, nitrogen in the form of a fertilizer containing nitrogen, such as ammonium sulfate, ammonium nitrate, ammonium chloride, urea, or lime nitrogen, can be used. When a nitrogen-containing fertilizer contains phosphorus and/or potassium in the form applicable as a fertilizer, it can also serve as a phosphorus-containing fertilizer and/or a potassium-containing fertilizer.

As a fertilizer element, phosphorus in the form of a fertilizer containing phosphorus, such as ammonium phosphate (monobasic ammonium phosphate (ammonium dihydrogen phosphate), ammonium secondary phosphate (diammonium hydrogen phosphate), or ammonium tertiary phosphate (triammonium phosphate)), potassium phosphate (potassium primary phosphate (potassium dihydrogen phosphate) or potassium secondary phosphate (dipotassium hydrogen phosphate)), superphosphate, triple superphosphate, fused phosphate fertilizer, multi-phosphate fertilizer, or phosphorous acid, can be used. When a phosphorus-containing fertilizer contains nitrogen and/or potassium in the form applicable as a fertilizer, it can also serve as a nitrogen-containing fertilizer and/or potassium-containing fertilizer.

As a fertilizer element, potassium in the form of a fertilizer containing potassium, such as potassium sulfate, potassium chloride, or potassium bicarbonate, can be used. When a potassium-containing fertilizer contains phosphorus and/or nitrogen in the form applicable as a fertilizer, it can also serve as a phosphorus-containing fertilizer and/or nitrogen-containing fertilizer.

In addition, fertilizer elements in the form usable by plants: a fertilizer containing calcium, such as burnt lime, hydrated lime, magnesium lime, or calcium carbonate; a fertilizer containing silicon, such as calcium silicate; a slag silicate fertilizer; a fertilizer containing magnesium, such as magnesium sulfate, magnesium chloride, or humic acid magnesium; a fertilizer containing manganese, such as manganese sulfate, magnesium/manganese sulfate, or slag manganese; a fertilizer containing boron, such as boric acid or borate; a composite fertilizer of trace elements; a fertilizer containing iron, such as iron/steel slag; or a fertilizer containing zinc, such as zinc sulfate, can be used.

While a GSSG molecule contains nitrogen and it can contain an element that can be another fertilizer element as a GSSG salt counter ion, the "fertilizer element" used in combination with GSSG in the fertilizer composition, fertilizer kit, or method according to one or more embodiments of the present invention means a fertilizer element existing in the form other than GSSG.

3. Foliar Application of GSSG and Fertilizer Elements

In one or more embodiments of the present invention, GSSG and a fertilizer element are applied to leaves of a plant. The examples verify that plant growth can be promoted to a significant extent as a result of foliar application of GSSG and a fertilizer element.

Foliar application of GSSG and a fertilizer element may not necessarily be performed simultaneously or continuously. Foliar application of GSSG and a fertilizer element may be performed at different time points. Also, it is not necessary that GSSG and a fertilizer element be integrated into a composition. GSSG and a fertilizer element may be contained in physically separate compositions, and such separate compositions may be applied simultaneously, continuously, or at different time points. The composition containing the components and the constitution of the kit are as described below. GSSG and a fertilizer element used in the method according to one or more embodiments of the present invention are not necessarily prepared in the form of the composition or kit according to one or more embodiments of the present invention described below. GSSG and a fertilizer element may be independently prepared. Use of GSSG and a fertilizer element in the form of the composition or kit according to one or more embodiments of the present invention described below and, in particular, use thereof in the form of the composition according to one or more embodiments of the present invention, in the method according to one or more embodiments of the present invention is preferable because of simple procedures. When a plurality of fertilizer elements is used, also, such plurality of fertilizer elements may be applied simultaneously or continuously. At least a part of the fertilizer elements may be applied to leaves at different time points. It is not necessary that a plurality of fertilizer elements be integrated into a composition, and two or more physically independent compositions each containing one or more such elements may be applied simultaneously, continuously, or at different time points.

GSSG and a fertilizer element can be applied to leaves by, for example, a method in which a solution or dispersion containing the components in water and/or an water-soluble solvent (for example, in the form of a solution) is allowed to adhere to the leaf surface or a method in which a solid, such as a powder containing the components, is allowed to adhere to the leaf surface. As the water-soluble solvent, an alcohol such as ethanol or methanol can be used. The solution can be applied to the leaf surface via, for example, spraying or coating.

The proportion of GSSG to the fertilizer element for foliar application is not particularly limited, and such proportion can be adequately determined. In one or more embodiments, GSSG and a fertilizer element are applied to leaves at a proportion, so that GSSG and a fertilizer element can synergistically promote plant growth. In one or more embodiments, when nitrogen is applied as a fertilizer element, relative to a total of 100 parts by mass of GSSG (wherein the mass and the parts by mass of GSSG are expressed in terms of free GSSG, unless otherwise specified, and the same applies hereinbelow), the amount of nitrogen is, for example, 1 part by mass or more (wherein the mass and the parts by mass of nitrogen as a fertilizer element are expressed in terms of the N atom, unless otherwise specified, and the same applies hereinbelow), preferably 10 parts by mass or more, more preferably 20 parts by mass or more, and still more preferably 30 parts by mass or more to 1,000 parts by mass or less, preferably 800 parts by mass or less, more preferably 400 parts by mass or less, more preferably 350 parts by mass or less, more preferably 300 parts by mass or less, more preferably 250 parts by mass or less, more preferably 200 parts by mass or less, and still more preferably 150 parts by mass or less. In one or more embodiments, the amount is preferably 1 to 1,000 parts by mass, more preferably 10 to 800 parts by mass, more preferably 10 to 400 parts by mass, more preferably 10 to 150 parts by mass, more preferably 20 to 400 parts by mass, more preferably 20 to 150 parts by mass, more preferably 30 to 400 parts by mass, more preferably 30 to 350 parts by mass, more preferably 30 to 300 parts by mass, more preferably 30 to 250 parts by mass, more preferably 30 to 200 parts by mass, and most preferably 30 to 150 parts by mass. In one or more embodiments, when phosphorus is applied as a fertilizer element, relative to a total of 100 parts by mass of GSSG (the same as above), the amount of phosphorus is, for example, 1 part by mass or more (wherein the mass and the parts by mass of phosphorus as a fertilizer element are expressed in terms of $P_2O_5$, unless otherwise specified, and the same applies hereinbelow), preferably 10 parts by mass or more, more preferably 20 parts by mass or more, and still more preferably 30 parts by mass or more to 1,200 parts by mass or less, preferably 500 parts by mass or less, more preferably 400 parts by mass or less, more preferably 350 parts by mass or less, more preferably 300 parts by mass or less, more preferably 250 parts by mass or less, more preferably 200 parts by mass or less, and still more preferably 150 parts by mass or less. In one or more embodiments, the amount is preferably 10 to 1,200 parts by mass, more preferably 10 to 500 parts by mass, still more preferably 10 to 400 parts by mass, further preferably 10 to 150 parts by mass, still further preferably 20 to 500 parts by mass, furthermore preferably 20 to 400 parts by mass, still furthermore preferably 20 to 150 parts by mass, more preferably 30 to 400 parts by mass, more preferably 30 to 350 parts by mass, more preferably 30 to 300 parts by mass, more preferably 30 to 250 parts by mass, more preferably 30 to 200 parts by mass, and most preferably 30 to 150 parts by mass. In one or more embodiments, when potassium is applied as a fertilizer element, relative to a total of 100 parts by mass of GSSG (the same as above), the amount of potassium is, for example, 1 part by mass or more (wherein the mass and the parts by mass of potassium as a fertilizer element are expressed in terms of $K_2O$, unless otherwise specified, and the same applies hereinbelow), preferably 10 parts by mass or more, more preferably 20 parts by mass or more, and still more preferably 30 parts by mass or more to 1,200 parts by mass or less, preferably 500 parts by mass or less, more preferably 400 parts by mass or less, more preferably 350 parts by mass or less, more preferably 300 parts by mass or less, more preferably 250 parts by mass or less, more preferably 200 parts by mass or less, and still more preferably 150 parts by mass or less. In one or more embodiments, the amount is preferably 10 to 1,200 parts by mass, more preferably 10 to 500 parts by mass, still more preferably 10 to 200 parts by mass, still further preferably 10 to 150 parts by mass, further preferably 20 to 500 parts by mass, further preferably 20 to 200 parts by mass, further preferably 20 to 150 parts by mass, further 30 to 200 parts by mass, more preferably 30 to 400 parts by mass, more preferably 30 to 350 parts by mass, more preferably 30 to 300 parts by mass, more preferably 30 to 250 parts by mass, more preferably 30 to 200 parts by mass, and most preferably 30 to 150 parts by mass. The quantitative ratio exemplified herein is not limited to the quantitative ratio in the amount applied at a time (either simultaneously or continuously), and it may be a ratio relative to a total amount of components applied to plants. In one or more embodiments, it is preferable that the quantitative ratio of components to be applied simultaneously or continuously be within the range mentioned above.

The amount of GSSG and a fertilizer element for foliar application is not particularly limited, and GSSG and a fertilizer element may be applied in an amount effective for promoting plant growth and, in particular, in an amount effective for synergistically promoting plant growth. As an effective amount of application for plant growth promotion, the amount of GSSG (in terms of a free form) applied per plant is generally 0.01 mg or more, such as 0.1 mg or more. While the upper limit is not particularly limited, the amount is generally 100 mg or less, such as 30 mg or less. When nitrogen is applied as a fertilizer element, the amount of nitrogen (in terms of N) applied per plant is generally 0.01 mg or more, such as 0.1 mg or more. While the upper limit is not particularly limited, the amount is generally 100 mg or less, such as 30 mg or less. When phosphorus is applied as a fertilizer element, the amount of phosphorus (in terms of $P_2O_5$) applied per plant is generally 0.01 mg or more, such as 0.1 mg or more. While the upper limit is not particularly limited, the amount is generally 100 mg or less, such as 30 mg or less. When potassium is applied as a fertilizer element, the amount of potassium (in terms of $K_2O$) applied per plant is generally 0.01 mg or more, such as 0.1 mg or more. While the upper limit is not particularly limited, the amount is generally 100 mg or less, such as 30 mg or less.

The fertilizer element may be applied to leaves at any timing without particular limitation. In one or more embodiments, the fertilizer element is preferably applied during the vegetative growth period (at the time of leaf growth and root growth) or during the generative growth period (at the time of budding, flowering, or fruiting). The number of application is not limited, and application may be separately carried out a plurality of times.

When plants are cultivated by the method according to one or more embodiments of the present invention, in addition to foliar application of GSSG and a fertilizer element, the GSSG and/or fertilizer element may be applied to parts other than leaves (e.g., roots) of a plant, and in one or more embodiments, the fertilizer element is more preferably applied thereto. GSSG and/or a fertilizer element can be applied to the root via application thereof to soil and/or water that is in contact with a plant's root. When GSSG or a certain fertilizer element is applied to a part of a plant other than leaves, the amount thereof to be applied thereto is not particularly limited. In one or more embodiments, when the amount of GSSG or a certain fertilizer element to be applied to leaves is 100 parts by mass, for example, the amount of GSSG or the certain fertilizer element to be applied to a part other than leaves is preferably 0.01 to 1,000,000 parts by mass, and more preferably 0.1 to 100,000 parts by mass.

4. Fertilizer Composition and Fertilizer Kit

The form of the fertilizer composition for application to leaves of a plant comprising oxidized glutathione and a fertilizer element of the present invention is not particularly limited. The fertilizer composition according to one or more embodiments of the present invention can be in any form. For example, it can be in the form of: a liquid that can be directly sprayed or coated to the target plant's leaf surface; a liquid that is diluted with a solvent, such as water, a water-soluble solvent (e.g., methanol or ethanol), or a mixture of two or more such solvents before use; powder that is dissolved or dispersed in a solvent, such as water, a water-soluble solvent (e.g., methanol or ethanol), or a mixture of two or more such solvents before use; a solid such as a granule; a solid such as powder (a powdery agent) that can be directly sprayed to the target plant's leaf surface; or a solid such as powder (a powdery agent) that is diluted with a solid such as clay, talc, or soil before use. From the viewpoint of storage stability, a solid form may be used.

When the fertilizer composition according to one or more embodiments of the present invention is a liquid, in addition to oxidized glutathione and a fertilizer element, the fertilizer composition may contain other components. Examples thereof include a solvent, such as water and a water-soluble solvent (e.g., methanol or ethanol), a surfactant (e.g., linear alkylbenzene sulfonate), a dispersion stabilizer (e.g., carboxymethyl cellulose and a salt thereof), a thickener, and an antioxidant.

When the fertilizer composition according to one or more embodiments of the present invention is a solid, the fertilizer composition may contain other components. Examples thereof include a surfactant (e.g., linear alkylbenzene sulfonate, alkyl naphthalene sulfonate, lauryl sulfate, and castor oil potash soap), a dispersion stabilizer (e.g., carboxymethyl cellulose and a salt thereof), an excipient (e.g., lactose), a disintegrator, a thickener, and an antioxidant.

In the fertilizer composition according to one or more embodiments of the present invention, the proportion of oxidized glutathione mixed with a fertilizer element can be determined as with the case of application thereof described in 3. above.

A method for producing the fertilizer composition of the present invention is not particularly limited. The components may be mixed with each other. For example, a solid composition may be produced via pulverization, granulation, dehydration, or other treatment, according to need. A liquid composition may be produced via stirring, emulsification, dispersion, or other means, according to need.

In one or more embodiments, when 3 g of the fertilizer composition according to one or more embodiments of the present invention is dispersed in 100 ml of distilled water at 25° C., preferably, a pH value of the fertilizer composition is 2.0 to 6.5, more preferably 6.0 or less, further preferably 5.5 or less, still further preferably 5.0 or less, and most preferably 4.5 or less. When the pH level is equivalent to or lower than the upper limit under the conditions described above, oxidized glutathione can exist stably in the fertilizer composition according to one or more embodiments of the present invention. Accordingly, satisfactory effects can be attained via foliar application of the fertilizer composition. When the pH level is equivalent to or higher than the lower limit under the conditions described above, damage is less likely to occur upon application of the fertilizer composition according to one or more embodiments of the present invention to plants. That is, the pH level within the range as described above may be used.

In the measurement, distilled water produced with the use of an apparatus for producing distilled water (i.e., an apparatus for distillation of water from ion-exchange water and filtration) or commercially available distilled water can be used.

In the measurement, distilled water is introduced into a container, such as a 200-ml beaker, the fertilizer composition according to one or more embodiments of the present invention is added thereto, and the content is agitated with the use of a stirrer or other agitation means, so as to thoroughly disperse the fertilizer composition. In this case, water-soluble components are dissolved, and insoluble components, if any, are thoroughly dispersed.

The fertilizer composition according to one or more embodiments of the present invention exhibiting a pH value of 2.0 to 6.5 when 3 g thereof is dispersed in 100 ml of distilled water at 25° C. may be any of the forms described above. In one or more embodiments, the fertilizer composition is in the form of a solid, such as powders or granules that is dissolved or dispersed in a solvent, such as water, a water-soluble solvent (e.g., methanol or ethanol), or a mixture of two or more such solvents before use, a solid, such as powder (a powdery agent) that can be directly sprayed to the target plant's leaf surface, or a solid, such as powder (a powdery agent) that is diluted with a solid, such as clay, talc, or soil before use.

The fertilizer kit according to one or more embodiments of the present invention for application to leaves of a plant comprises oxidized glutathione and a fertilizer element separately from each other. When the kit comprises oxidized glutathione and a fertilizer element separately from each other, for example, the oxidized glutathione and the fertilizer element may be separately packaged in different containers, or the oxidized glutathione and the fertilizer element may be partitioned and packaged in the same container, so that the oxidized glutathione and the fertilizer element are not mixed with each other in the kit.

The fertilizer kit according to one or more embodiments of the present invention can comprise a composition containing oxidized glutathione separately from a composition containing a fertilizer element. A composition containing oxidized glutathione may be composed of a plurality of separate compositions, and a composition containing a fertilizer element may be composed of a plurality of separate compositions. When the kit according to one or more embodiments of the present invention comprises a plurality of fertilizer elements, a composition containing such fertilizer elements may be an integrated single composition, or it may be composed of 2 or more separate compositions each containing one or more fertilizer elements. As described with reference to the fertilizer composition above, the compositions constituting the kit can be in any form. For example, it can be in the form of: a liquid that can be directly sprayed or coated to the target plant's leaf surface; a liquid that is diluted with a solvent, such as water, a water-soluble solvent (e.g., methanol or ethanol), or a mixture of two or more such solvents before use; powder that is dissolved or dispersed in a solvent, such as water, a water-soluble solvent (e.g., methanol or ethanol), or a mixture of two or more such solvents before use; a solid such as a granule; a solid such as powder (a powdery agent) that can be directly sprayed to the target plant's leaf surface; or a solid such as powder (a powdery agent) that is diluted with a solid such as clay, talc, or soil before use. From the viewpoint of storage stability, a solid form may be used. Examples of other components contained in the compositions constituting the fertilizer kit according to one or more embodiments of the present invention include the other components that may be contained in the fertilizer composition according to one or more embodiments of the present invention mentioned above. Concerning the method for producing the compositions constituting the fertilizer kit according to one or more embodiments of the present invention, also, the method same as the method for producing the fertilizer composition according to one or more embodiments of the present invention mentioned above can also be adopted.

In the fertilizer kit according to one or more embodiments of the present invention, the proportion of the oxidized glutathione to the fertilizer element can be determined as with the case of application thereof described in 3. above.

The fertilizer composition and the fertilizer kit according to one or more embodiments of the present invention are useful as a fertilizer composition and a fertilizer kit, respectively, for promoting plant growth and, preferably, for increasing a plant weight.

5. Use

One or more embodiments of the present invention relate to use of oxidized glutathione and a fertilizer element for application to leaves of a plant, in cultivating the plant.

Embodiments of application of oxidized glutathione and a fertilizer element to leaves of a plant during cultivation of the plant are as described in 3. above.

According to the use of one or more embodiments of the present invention, the oxidized glutathione and the fertilizer element are preferably in the form of the fertilizer composition or the fertilizer kit according to one or more embodiments of the present invention as described in detail in 4. above. Alternatively, such components may be independently prepared.

6. Target Plants

Target plants to which the fertilizer according to one or more embodiments of the present invention is to be applied are not particularly limited, and examples thereof include various plants, such as dicotyledons and monocotyledons.

Examples of dicotyledons to which the fertilizer according to one or more embodiments of the present invention is to be applied include plants of *Pharbitis, Convolvulus, Ipomoea, Cuscuta, Dianthus, Stellaria, Minuartia, Cerastium, Sagina japonica, Arenaria, Moehringia, Pseudostellaria, Honkenya, Spergula, Silene, Lychnis, Silene firma*, Caryophyllaceae, Casuarinaceae, Saururaceae, Piperaceae, Chloranthaceae, Salicaceae, Myricaceae, Juglandaceae, Betulaceae, Fagaceae, Ulmaceae, Moraceae, Urticaceae, Podostemaceae, Proteaceae, Olacaceae, Santalaceae, Loranthaceae, Aristolochiaceae, Rafflesiaceae, Balanophoraceae, Polygonaceae, Chenopodiaceae, Amaranthaceae, Nyctaginaceae, Theligonaceae, Phytolaccaceae, Aizoaceae, Portulacaceae, Magnoliaceae, Trochodendraceae, Cercidiphyllaceae, Nymphaeaceae, Ceratophyllaceae, Ranunculaceae, Lardizabalaceae, Berberidaceae, Menispermaceae, Calycanthaceae, Lauraceae, Papaveraceae, Capparaceae, Brassicaceae, Droseraceae, Nepenthaceae, Crassulaceae, Saxifragaceae, Pittosporaceae, Hamamelidaceae, Platanaceae, Rosaceae, Leguminosae, Oxalidaceae, Geraniaceae, Linaceae, Zygophyllaceae, Rutaceae, Simaroubaceae, Meliaceae, Polygalaceae, Euphorbiaceae, Callitrichaceae, Buxaceae, Empetraceae, Coriariaceae, Anacardiaceae, Aquifoliaceae, Celastraceae, Staphyleaceae, Icacinaceae, Aceraceae, Hippocastanaceae, Sapindaceae, Sabiaceae, Balsaminaceae, Rhamnaceae, Vitaceae, Elaeocarpaceae, Tiliaceae, Malvaceae, Sterculiaceae, Dilleniaceae, Theaceae, Guttiferae, Elatinaceae, Tamaricaceae, Violaceae, Flacourtiaceae, Stachyuraceae, Passifloraceae, Begoniaceae, Cactaceae, Thymelaeaceae, Elaeagnaceae, Lythraceae, Punicaceae, Rhizophoraceae, Alangiaceae, Melastomataceae, Trapaceae, Onagraceae, Haloragaceae, Hippuridaceae, Araliaceae, Umbelliferae, Cornaceae, Diapensiaceae, Clethraceae, Pyrolaceae, Ericaceae, Myrsinaceae, Primulaceae, Plumbaginaceae, Ebenaceae, Symplocaceae, Styracaceae, Oleaceae, Buddlejaceae, Gentianaceae, Apocynaceae, Asclepiadaceae, Polemoniaceae, Boraginaceae, Verbenaceae, Lamiaceae, Solanaceae, Scrophulariaceae, Bignoniaceae, Pedaliaceae, Orobanchaceae, Gesneriaceae, Lentibulariaceae, Acanthaceae, Myoporaceae, Phrymaceae, Plantaginaceae, Rubiaceae, Caprifoliaceae, Adoxaceae, Valerianaceae, Dipsacaceae, Cucurbitaceae, Campanulaceae, and Asteraceae.

Examples of monocotyledons to which the controlled-release fertilizer according to one or more embodiments of the present invention is to be applied include plants of *Spirodela, Lemna, Cattleya, Cymbidium, Dendrobium, Phalaenopsis, Vanda, Paphiopedilum*, Orchidaceae, Typhaceae, Sparganiaceae, Potamogetonaceae, Najadaceae, Scheuchzeriaceae, Alismataceae, Hydrocharitaceae, Triuridaceae, Gramineae, Cyperaceae, Palmae, Araceae, Eriocaulaceae, Commelinaceae, Pontederiaceae, Juncaceae, Stemonaceae, Liliaceae, Amaryllidaceae, Dioscoreacea, Iridaceae, Musaceae, Zingiberaceae, Cannaceae, and Burmanniaceae.

Target plants are not limited to wild-type plants, and mutants, transformants, and other types of plants may be the targets.

EXAMPLES

Hereafter, one or more embodiments of the present invention are illustrated with reference to specific examples, although the technical scope of the present invention is not limited to these examples. It should be noted that GSSG used in the following examples does not contain reduced glutathione.

Example 1: Production of Water-Soluble Preparation

1. Composition

The GSSG-containing fertilizer compositions having the formulations as shown in the tables below were produced in the form of two types of water-soluble preparations; i.e., a finely-powdered water-soluble preparation and a granular preparation. In the formulations A and B shown below, GSSG in the form of an ammonium salt was used. The proportions shown in Tables 1 and 2 are in terms of the salts as described above.

TABLE 1

| Formulation A | | |
| --- | --- | --- |
| Components | Mass % | Mass (g) |
| Oxidized glutathione ammonium salt (Kaneka Corporation) | 10.6 | 10.6 |
| Ammonium sulfate (Sumitomo Chemical Co., Ltd.) | 46.2 | 46.2 |
| Monobasic ammonium phosphate (Shimonoseki Mitsui Chemicals, Inc.) | 19.5 | 19.5 |
| Potassium sulfate (MITSUI & CO., LTD.) | 23.7 | 23.7 |
| Total | 100 | 100 |

TABLE 2

| Formulation B | | |
| --- | --- | --- |
| Components | Mass % | Mass (g) |
| Oxidized glutathione ammonium salt (Kaneka Corporation) | 17.2 | 86 |

TABLE 2-continued

Formulation B

| Components | Mass % | Mass (g) |
|---|---|---|
| Ammonium sulfate (Sumitomo Chemical Co., Ltd.) | 33.4 | 167 |
| Monobasic ammonium phosphate (Shimonoseki Mitsui Chemicals, Inc.) | 18.8 | 94 |
| Potassium sulfate (MITSUI & CO., LTD.) | 23 | 115 |
| Linear alkylbenzene sulfonate Na (LAS) (Lion Corporation) | 7.5 | 37.5 |
| Carboxymethyl cellulose Na (CMC Na) (DKS Co. Ltd.) | 0.1 | 0.5 |
| Total | 100 | 500 |

2. Production of Finely-Powdered Water-Soluble Preparations

Figure 1:
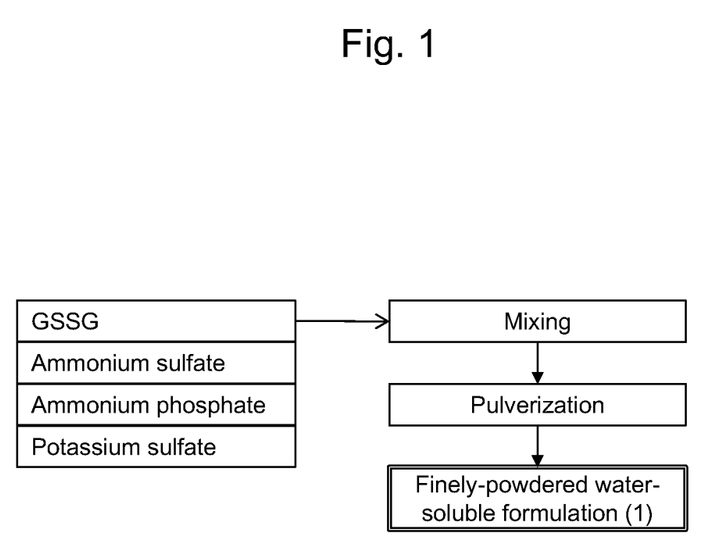
FIG. 1 shows a flow chart demonstrating a process of producing the finely-powdered GSSG-containing fertilizer composition according to one or more embodiments of the present invention.

The finely-powdered water-soluble preparation (1) of the formulation A above was prepared in accordance with the process shown in FIG. 1. Specifically, oxidized glutathione ammonium salt, ammonium sulfate, monobasic ammonium phosphate, and potassium sulfate were mixed, and the mixture was pulverized to prepare the finely-powdered water-soluble preparation (1). 3 g of the finely-powdered water-soluble preparation (1) was weighed, dispersed in 100 ml of distilled water at 25° C. in a 200-ml beaker, and thoroughly dissolved therein with the use of a stirrer. Thereafter, the pH level was measured with the use of a pH meter and found to be 3.9.

Figure 2:
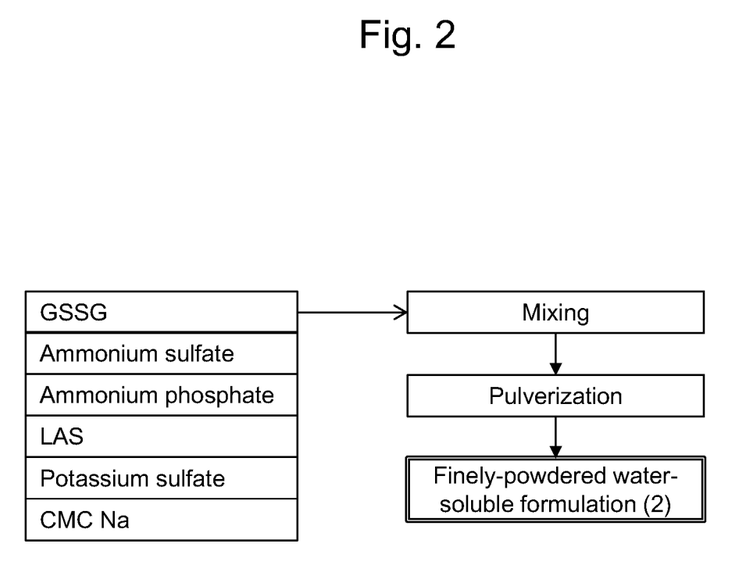
FIG. 2 shows a flow chart demonstrating a process of producing the finely-powdered GSSG-containing fertilizer composition according to one or more embodiments of the present invention.

The finely-powdered water-soluble preparation (2) of the formulation B above was prepared in accordance with the process shown in FIG. 2. Specifically, oxidized glutathione ammonium salt, ammonium sulfate, monobasic ammonium phosphate, potassium sulfate, linear alkylbenzene sulfonate, and carboxymethyl cellulose sodium were mixed, and the mixture was pulverized to prepare the finely-powdered water-soluble preparation (2). 3 g of the finely-powdered water-soluble preparation (2) was weighed, dispersed in 100 ml of distilled water at 25° C. in a 200-ml beaker, and thoroughly dissolved therein with the use of a stirrer. Thereafter, the pH level was measured with the use of a pH meter and found to be 3.9.

3. Production of Granular Water-Soluble Preparation

Figure 3:
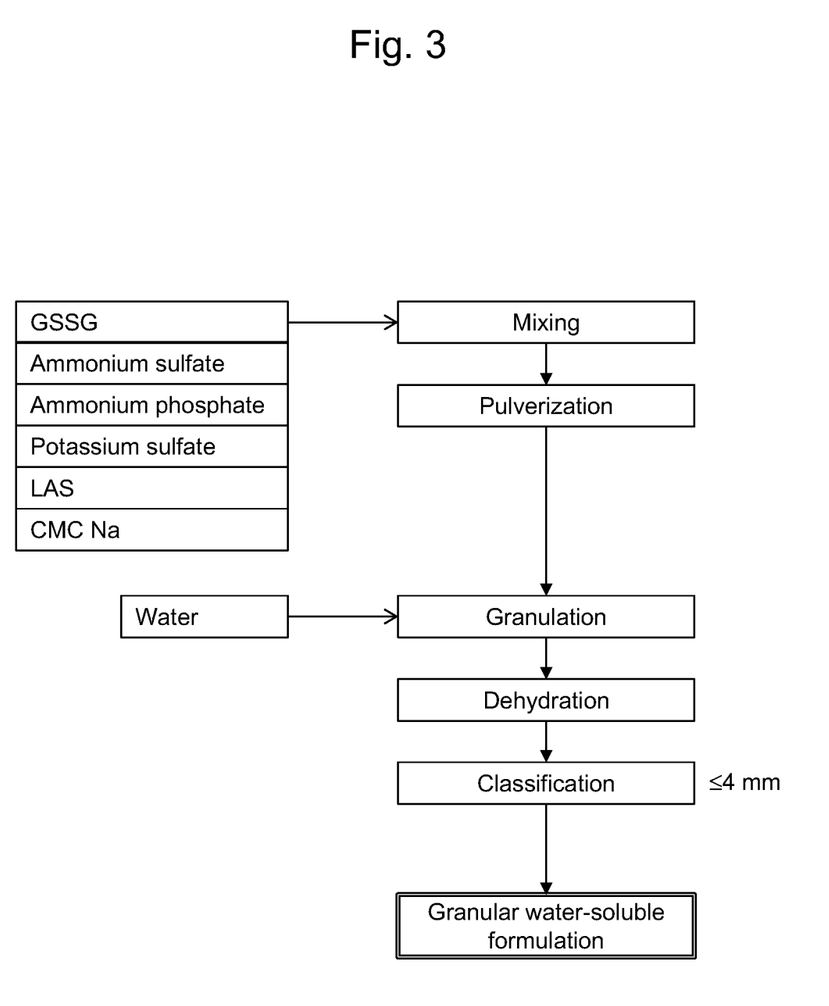
FIG. 3 shows a flow chart demonstrating a process of producing the granular GSSG-containing fertilizer composition according to one or more embodiments of the present invention.

The granular water-soluble preparation of the formulation B above was prepared in accordance with the process shown in FIG. 3.

At the outset, oxidized glutathione ammonium salt, ammonium sulfate, monobasic ammonium phosphate, potassium sulfate, linear alkylbenzene sulfonate, and carboxymethyl cellulose sodium were mixed, and the mixture was pulverized to prepare a finely-powdered mixture comprising the six raw materials.

Subsequently, an adequate amount of water (about 35 ml) was added, granules were prepared with the use of a granulator (SP Granulator, Fuji Paudal Co., Ltd.), and the resulting granules were then dehydrated using a fluidized-bed dryer (Midget Dryer, Fuji Paudal Co., Ltd.) at 70° C. for 15 minutes. The dehydrated granules were classified, granules having diameters greater than 4 mm were removed by a sieve classification, and 490 g of a granular water-soluble preparation with diameters of 4 mm or less was obtained (yield: 98%).

Example 2: Effects of Application on Leaf Surface

The GSSG-containing fertilizer composition according to one or more embodiments of the present invention was sprayed to the leaf surface and effects were then inspected.

1. Test Method

Lettuce seedlings (Green leaf lettuce, Sakata Seed Corporation) were raised under the conditions described below.
Duration: 2 weeks
Place: Inside a plant incubator
Soil: Black soil (40 ml/pot)
Temperature: 22° C.
Light: 115 µmol $m^{-2}$ $s^{-1}$ (10,000 lux) (light period: 16 hours; dark period: 8 hours)
Pot size: 7 cm×7 cm×5 cm
Number of tested plants (n): 3
Water supply: During the seedling-raising test, water was adequately supplied so as to prevent the soil in the pot from being dehydrated (about 20 ml/week).

Test groups: Four test groups: i.e., Control group, Comparative group 1, Comparative group 2, and Invention group, were provided as shown in Table 3 below.

(Control Group)

Control group was tested through application of fertilizer elements (nitrogen, phosphorus, and potassium) only to soil without the application of GSSG.

In the case of Control group, soil was prepared to comprise nitrogen, phosphorus, and potassium in an amount of 40 mg each (120 mg in total per pot) in terms of N, $P_2O_5$, and $K_2O$, respectively, at the time of sowing. Specifically, 40 ml of soil, 156 mg of ammonium sulfate, 66 mg of monobasic ammonium phosphate, and 80 mg of potassium sulfate were weighed and introduced into a container, these components were mixed to prepare a homogeneous composition, and the resultant was introduced into a pot. Ammonium sulfate used in the experiment contained 21% of nitrogen (in terms of N), and monobasic ammonium phosphate contained 11% of nitrogen (in terms of N) and 61% of phosphorus (in terms of $P_2O_5$), and potassium sulfate contained 50% of potassium (in terms of $K_2O$) (based on the indication of each product).

Lettuce seeds were sowed in soil in the pot and the seedling-raising test was then initiated.

(Comparative Group 1)

Comparative group 1 was tested through application of GSSG and a fertilizer elements (nitrogen, phosphorus, and potassium) only to soil.

The method for application of fertilizer elements to soil and the amount of application are as described above with reference to Control group.

GSSG was applied to soil with the addition of an aqueous solution of GSSG to soil. At the outset, an aqueous solution of GSSG (in terms of free GSSG, the same applies hereinbelow) dissolved at 300 ppm in water was prepared. Subsequently, the aqueous solution of GSSG was applied in an amount of 4 ml each (12 ml in total) three separate times at intervals of 3 days from 6 days after seedling raising was initiated. Thus, 3.6 mg of GSSG (in terms of free GSSG) was applied during the test period per pot.

(Comparative Group 2)

Comparative group 2 was tested through spray-application of GSSG to the leaf surface and application of fertilizer elements (nitrogen, phosphorus, and potassium) to soil.

The method for application of fertilizer elements to soil and the amount of application are as described above with reference to Control group.

GSSG was applied to the leaf surface by spraying an aqueous solution of GSSG to the leaf surface. An aqueous solution of GSSG as used in Comparative Example 1 (GSSG concentration: 300 ppm) was prepared, and the aqueous solution of GSSG was applied in an amount of 4 ml each (12 ml in total) three separate times at intervals of 3 days from 6 days after seedling raising was initiated. Thus, 3.6 mg of GSSG (in terms of free GSSG) was applied during the test period per pot.

(Invention Group)

Invention group was tested through spray-application of GSSG and a part (10%) of fertilizer elements (nitrogen, phosphorus, and potassium) to the leaf surface and application of the other 90% of the fertilizer elements to soil. The total amount of the fertilizer elements was adjusted to the same level as employed in other test groups.

In Invention group, soil was prepared to contain the fertilizer elements (i.e., 36 mg each of nitrogen, phosphorus, and potassium in terms of N, $P_2O_5$, and $K_2O$, respectively, 108 mg in total per pot) at the time of sowing. Specifically, 40 ml of soil and, as fertilizer elements, 140.4 mg of ammonium sulfate, 59.4 mg of ammonium phosphate, and 72 mg of potassium sulfate, were weighed and introduced into a container, these components were mixed to prepare a homogeneous composition, and the resultant was then introduced into a pot.

GSSG was spray-applied to the leaf surface as described below. The finely-powdered water-soluble preparation (1) of the formulation A as described in Example 1 (33.8 mg) was dissolved in 12 ml of water to prepare an aqueous solution containing GSSG and fertilizer elements. Subsequently, the aqueous solution containing GSSG and fertilizer elements was sprayed in an amount of 4 ml each (12 ml in total) to the leaf surface of the seedling three separate times at intervals of 3 days from 6 days after seedling raising was initiated in each pot. 12 ml of the aqueous solution containing GSSG and fertilizer elements to be sprayed to a pot contained 33.8 mg of the finely-powdered water-soluble preparation (1), and contained 3.5 mg of GSSG (in terms of free GSSG), 15.6 mg of ammonium sulfate, 6.6 mg of ammonium phosphate, and 8 mg of potassium sulfate.

TABLE 3

| | Weight to be applied (mg) | Control | Comp. Ex. 1 | Comp. Ex. 2 | Invention |
|---|---|---|---|---|---|
| Leaf surface | GSSG | — | — | 3.6 | 3.5 |
| | Ammonium sulfate | — | — | — | 15.6 |
| | Ammonium phosphate | — | — | — | 6.6 |
| | Potassium sulfate | — | — | — | 8 |
| Soil | GSSG | — | 3.6 | — | — |
| | Ammonium sulfate | 156 | 156 | 156 | 140.4 |
| | Ammonium phosphate | 66 | 66 | 66 | 59.4 |
| | Potassium sulfate | 80 | 80 | 80 | 72 |

Numerical values in the table indicate the total amount of spray-application of components (unit: mg) to the leaf surface or application thereof to soil during the test period per pot. In the table, the symbol "-" indicates that application to the leaf surface or soil is not performed.

2. Results

Two weeks after the completion of the test period, the fresh weight (the average) of the terrestrial parts of the plants of the test groups was measured to determine the growth rate.

The growth rate is indicated by a percentage figure of the fresh weight of the terrestrial parts of the plants of the test groups relative to the fresh weight of terrestrial parts of the plants of Control group (only the fertilizer elements were applied to soil).

TABLE 4

| | Control | Comp. Ex. 1 | Comp. Ex. 2 | Invention |
|---|---|---|---|---|
| Weight (mg) | 69 | 90 | 103 | 216 |
| Growth rate (%) | 100 | 130 | 149 | 314 |

3. Discussion

The results of comparison between Control group and Comparative group 1 demonstrate that plant growth is promoted via application of GSSG.

As a result of comparison between Comparative group 1 and Comparative group 2, an extent of plant growth promoted via spray-application of GSSG to the leaf surface was found to be greater than that promoted via application of GSSG to soil, although an extent of promotion was not significant.

As a result of comparison between Invention group and Comparative group 2, an extent of plant growth promoted via spray-application of GSSG and a part of the fertilizer elements was found to be twice or greater than that promoted via spray-application of GSSG to the leaf surface and application of fertilizer elements only to soil.

The growth rate observed in Comparative group 2 was approximately 1.15 times greater than that observed in Comparative group 1. By changing the application of a certain component to soil into the spray-application thereof to the leaf surface, accordingly, the growth rate can reasonably be deduced to elevate by approximately 1.15 times. In Invention group tested via spray-application of 10% of the fertilizer elements applied to soil in Comparative group 2 to the leaf surface and application of the other 90% of the fertilizer elements to soil as with Comparative group 2, accordingly, the plant growth ratio was deduced to be approximately 1.015 times greater than the plant growth ratio achieved in Comparative group 2 (i.e., 149%) (that is, the growth ratio achieved in Invention group was deduced to be approximately 151%). In fact, however, the growth rate achieved in Invention group was 314%, which was approximately 2.1 times greater than the growth rate achieved in Comparative group 2 (i.e., 149%). This indicates that synergistic effects of plant growth promotion are attained via spray-application of GSSG and fertilizer elements to the leaf surface.

Example 3: Stability Test

1. Production of Formulations

Granular water-soluble preparations of the formulations C, D, and E shown in Table 5 (hereafter, referred to as "fertilizer compositions") were prepared in the same manner as described above, except that a step of mixing the raw materials of the formulations and pulverizing the mixture was carried out instead of the step of mixing the six raw materials and pulverizing the mixture in the method described in "3. Production of granular water-soluble preparation" in Example 1. The water-soluble preparations thus prepared were subjected to evaluation described below.

2. Evaluation Procedure 2.1 pH Measurement 3 g each of the fertilizer compositions were weighed using a balance and dissolved in 100 ml of distilled water at 25° C. After all the components were dissolved with the use of a stirrer, the pH levels were measured using a pH meter.

2.2 Storage Stability 3 g each of the fertilizer compositions were weighed using a balance, introduced into aluminum bags, and then hermetically sealed. Thereafter, the bags were stored in an incubator at 60° C. for 1 week. The samples were removed from the incubator 1 week later, and the free GSSG content was measured via high-performance liquid chromatography (HPLC) (the conditions are described in detail below). The mass of free GSSG in the fertilizer compositions before the initiation of the storage test was designated as 100% and the mass of free GSSG remaining in the fertilizer compositions after the storage test relative thereto was determined. The relative values are shown as "storage stability" in Table 5.

2.2.1 HPLC Conditions

Mobile phase: 0.1% phosphoric acid:acetonitrile of 98:2 was continuously changed to 40:60 over the period of 15 minutes:

Column: COSMOSIL 5C18-AR-II, Nacalai Tesque
Column temperature: 30° C.
Detection wavelength: 210 nm
Flow rate: 1.0 ml/min Example 4: Effects of Spray-Application to Leaf Surface The GSSG-containing fertilizer composition according to one or more embodiments of the present invention was sprayed to the leaf surface to confirm the effects.

1. Test Method

Lettuce seedlings (Sauzer, Takii Co., Ltd.) were raised under the conditions described below.

Duration: 2 weeks
Place: Inside a plant incubator
Soil: Black soil (40 ml/pot)
Temperature: 20° C.
Light: 300 μmol $m^{-2}$ $s^{-1}$ (20,000 lux) (light period: 16 hours; dark period: 8 hours)
Pot size: 7 cm×7 cm×5 cm
Number of tested plants (n): 3

TABLE 5

| Components | Formulation C Composition (wt %) | Formulation C Weight (g) | Formulation D Composition (wt %) | Formulation D Weight (g) | Formulation E Composition (wt %) | Formulation E Weight (g) |
|---|---|---|---|---|---|---|
| Oxidized glutathione ammonium salt (GSSG•$NH_3$) (Kaneka Corporation) | 17.2 | 17.2 | 17.2 | 17.2 | 17.2 | 17.2 |
| Ammonium sulfate (Sumitomo Chemical Co., Ltd.) | | | 1.5 | 1.5 | | |
| Monobasic ammonium phosphate (Shimonoseki Mitsui Chemicals, Inc.) | 5 | 5 | 1.2 | 1.2 | 5.1 | 5.1 |
| Potassium sulfate (MITSUI & CO., LTD.) | | | | | 6.2 | 6.2 |
| Dipotassium hydrogen phosphate (Wako Pure Chemical Industries, Ltd.) | | | 6.1 | 6.1 | | |
| Potassium bicarbonate (Wako Pure Chemical Industries, Ltd.) | 6.8 | 6.8 | | | | |
| Lactose monohydrate (Wako Pure Chemical Industries, Ltd.) | 68 | 68 | 71 | 71 | 68.5 | 68.5 |
| Linear alkylbenzene sulfonate Na (LAS) (Lion Corporation) | 1 | 1 | 1 | 1 | 1 | 1 |
| Carboxymethyl cellulose (CMC Na) (DKS Co. Ltd.) | 2 | 2 | 2 | 2 | 2 | 2 |
| Total | 100 | 100 | 100 | 100 | 100 | 100 |
| pH | 6.6 | | 6.3 | | 4.0 | |
| Storage stability (Ratio of remaining free GSSG): | 67.9% | | 84.5% | | 99.8% | |

3. Discussion

It was confirmed that GSSG was maintained stably in the fertilizer composition according to one or more embodiments of the present invention. In a fertilizer composition having a pH value of 6.5 or less measured under the conditions described above, in particular, GSSG was maintained more stably. In a fertilizer composition having a pH value of 6.0 or less, in particular, GSSG was maintained stably.

Water supply: During the seedling-raising test, water was adequately supplied so as to prevent the soil in the pot from being dehydrated (about 20 ml/week).

Test groups: Four test groups: i.e., Control group, Comparative group 3, Comparative group 4, and Invention group, were provided as shown in Table 6 below.

(Control Group)

Control group was tested through application of fertilizer elements (nitrogen, phosphorus, and potassium) only to soil without the application of GSSG.

In the case of Control group, soil was prepared to contain 40 mg each of nitrogen, phosphorus, and potassium in terms of N, $P_2O_5$, and $K_2O$, respectively (120 mg in total per pot), at the time of sowing. Specifically, 40 ml of soil, 156 mg of ammonium sulfate, 66 mg of monobasic ammonium phosphate, and 80 mg of potassium sulfate were weighed and introduced into a container, these components were mixed to prepare a homogeneous composition, and the resultant was introduced into a pot. Ammonium sulfate used in the experiment contained 21% of nitrogen (in terms of N), and monobasic ammonium phosphate contained 11% of nitrogen (in terms of N) and 61% of phosphorus (in terms of $P_2O_5$), and potassium sulfate contained 50% of potassium (in terms of $K_2O$) (based on the indication of each product).

Lettuce seeds were sowed in soil in the pot and the seedling-raising test was then initiated.

(Comparative Group 3)

Comparative group 3 was tested through spray-application of a part (10%) of fertilizer elements (nitrogen, phosphorus, and potassium) to the leaf surface and application of the other 90% of the fertilizer elements to soil. The total amount of the fertilizer elements was adjusted to the same level as employed in other test groups.

The amount of the fertilizer elements to be applied to soil was adjusted in such a manner that the amount of each of nitrogen, phosphorus, and potassium would be 36 mg in terms of N, $P_2O_5$, and $K_2O$, respectively (108 mg in total per pot), at the time of sowing. Specifically, 40 ml of soil and, as fertilizer elements, 140.4 mg of ammonium sulfate, 59.4 mg of ammonium phosphate, and 72 mg of potassium sulfate, were weighed and introduced into a container, these components were mixed to prepare a homogeneous composition, and the resultant was then introduced into a pot.

The fertilizer elements were spray-applied to the leaf surface as described below. Ammonium sulfate (15.6 mg), 6.6 mg of ammonium phosphate, and 8 mg of potassium sulfate were dissolved in 12 ml of water to prepare an aqueous solution of fertilizer. Subsequently, the aqueous solution of fertilizer was sprayed in an amount of 4 ml each (12 ml in total) to the leaf surface of the seedling three separate times at intervals of 3 days from 6 days after seedling raising was initiated in each pot.

(Comparative Group 4)

Comparative group 4 was tested through spray-application of a part (10%) of fertilizer elements (nitrogen, phosphorus, and potassium) to the leaf surface and application of the other 90% of the fertilizer elements to soil. The total amount of the fertilizer elements was adjusted to the same level as employed in other test groups.

The amount of the fertilizer elements to be applied to soil was adjusted in such a manner that the amount of each of nitrogen, phosphorus, and potassium would be 36 mg in terms of N, $P_2O_5$, and $K_2O$, respectively (108 mg in total per pot), at the time of sowing. Specifically, 40 ml of soil and, as fertilizer elements, 140.4 mg of ammonium sulfate, 59.4 mg of ammonium phosphate, and 72 mg of potassium sulfate, were weighed and introduced into a container, these components were mixed to prepare a homogeneous composition, and the resultant was then introduced into a pot.

GSSG was applied to soil with the addition of an aqueous solution of GSSG to soil. At the outset, an aqueous solution of GSSG (in terms of free GSSG, the same applies hereinbelow) dissolved at 300 ppm in water was prepared. Subsequently, the aqueous solution of GSSG was applied in an amount of 4 ml each (12 ml in total) three separate times at intervals of 3 days from 6 days after seedling raising was initiated. Thus, 3.6 mg of GSSG (in terms of free GSSG) would be applied during the test period per pot.

For spray-application to the leaf surface, an aqueous solution of fertilizer was prepared by dissolving 15.6 mg of ammonium sulfate, 6.6 mg of ammonium phosphate, and 8 mg of potassium sulfate in 12 ml of water. Subsequently, the aqueous solution of fertilizer was sprayed in an amount of 4 ml each (12 ml in total) to the leaf surface of the seedling with the use of a sprayer three separate times at intervals of 3 days from 6 days after seedling raising was initiated in each pot.

(Invention Group)

Invention group was tested through spray-application of GSSG and a part (10%) of fertilizer elements (nitrogen, phosphorus, and potassium) to the leaf surface and application of the other 90% of the fertilizer elements to soil. The total amount of the fertilizer elements was adjusted to the same level as employed in other test groups.

In Invention group, the amount of the fertilizer elements to be applied to soil was adjusted in such a manner that the amount of each of nitrogen, phosphorus, and potassium would be 36 mg in terms of N, $P_2O_5$, and $K_2O$, respectively, (108 mg in total per pot) at the time of sowing. Specifically, 40 ml of soil and, as fertilizer elements, 140.4 mg of ammonium sulfate, 59.4 mg of ammonium phosphate, and 72 mg of potassium sulfate, were weighed and introduced into a container, these components were mixed to prepare a homogeneous composition, and the resultant was then introduced into a pot.

GSSG was spray-applied to the leaf surface as described below. 33.8 mg of the finely-powdered water-soluble preparation (1) of the formulation A as described in Example 1 was dissolved in 12 ml of water to prepare an aqueous solution containing GSSG and fertilizer elements. Subsequently, the aqueous solution containing GSSG and fertilizer elements was sprayed in an amount of 4 ml each (12 ml in total) to the leaf surface of the seedling three separate times at intervals of 3 days from 6 days after seedling raising was initiated in each pot. 12 ml of the aqueous solution containing GSSG and fertilizer elements to be sprayed to a pot contained 33.8 mg of the finely-powdered water-soluble preparation (1), and contained 3.5 mg of GSSG (in terms of free GSSG), 15.6 mg of ammonium sulfate, 6.6 mg of ammonium phosphate, and 8 mg of potassium sulfate.

TABLE 6

| | Weight applied (mg) | Control | Comp. Ex. 3 | Comp. Ex. 4 | Invention |
|---|---|---|---|---|---|
| Leaf surface | GSSG | — | — | — | 3.5 |
| | Ammonium sulfate | — | 15.6 | 15.6 | 15.6 |
| | Ammonium phosphate | — | 6.6 | 6.6 | 6.6 |
| | Potassium sulfate | — | 8 | 8 | 8 |
| Soil | GSSG | — | — | 3.6 | — |
| | Ammonium sulfate | 156 | 140.4 | 140.4 | 140.4 |
| | Ammonium phosphate | 66 | 59.4 | 59.4 | 59.4 |
| | Potassium sulfate | 80 | 72 | 72 | 72 |

Numerical values in the table indicate the total amount of components sprayed (unit: mg) to the leaf surface or application to soil during the test period per pot. In the table, the symbol "-" indicates that application to the leaf surface or soil is not performed.

2. Results

Two weeks after the completion of the test period, the fresh weight (the average) of the terrestrial parts of the plants of the test groups was measured to determine the growth rate.

The growth rate is indicated by a percentage figure of the fresh weight of the terrestrial part of the test groups relative to the fresh weight of terrestrial part in Control group (application of fertilizer elements to soil).

TABLE 7

|  | Control | Comp. Ex. 3 | Comp. Ex. 4 | Invention |
|---|---|---|---|---|
| Weight (mg) | 73 | 75 | 92 | 210 |
| Growth rate (%) | 100 | 103 | 126 | 288 |

Example 5: Effects of Spray-Application to Leaf Surface (Spray Application to Potato Leaf Surface)

The GSSG-containing fertilizer composition according to one or more embodiments of the present invention was sprayed to the leaf surface and the effects thereof were inspected.

1. Test Method

Potatoes (May Queen) were cultivated under the conditions described below.

Duration: approximately 3 months (March to June)
Place: Ordinary farmer's field, Sayo Town, Hyogo Prefecture, Japan
Base fertilizer: cow manure compost (1 t/10 a), phosphorous-ammonium nitrate-potassium S-604 (16-10-14) 100 kg/10 a, hydrated lime 100 kg/10 a
Cultivation distance: 80 cm (inter-row space)×30 cm (inter-plant distance), single-row planting
Test groups: Four test groups: i.e., Control group, Comparative group 5, Comparative group 6, and Invention group, were provided as shown in Table 9 below.

(Control Group)

Control group was tested through application of fertilizer elements (nitrogen, phosphorus, and potassium) only to soil without the application of GSSG.

(Comparative Group 5)

Comparative group 5 was tested through spray application of fertilizer elements (nitrogen, phosphorus, and potassium) to the leaf surface in the amount equivalent to that employed in Invention group and treatment of soil in the same manner as in Control group. The total amount of the fertilizer elements was adjusted to the same level as employed in Invention group.

The amount of the fertilizer elements to be spray-applied to the leaf surface was adjusted in such a manner that the amount of nitrogen, phosphorus, and potassium would be 0.22 mg each (0.66 mg in total/plant) in terms of N, $P_2O_5$, and $K_2O$, respectively. Specifically, fertilizer elements; i.e., 0.86 mg of ammonium sulfate, 0.36 mg of ammonium phosphate, and 0.44 mg of potassium sulfate, were dissolved in 24 ml of water. Subsequently, the aqueous solution of fertilizer was sprayed to the leaf surface using a sprayer 4 weeks after planting.

(Comparative Group 6)

Comparative group 6 was tested through spray-application of GSSG to the leaf surface in the amount equivalent to that employed in Invention group and treatment of soil in the same manner as in Control group. The total amount of the fertilizer elements was adjusted to the same level as employed in Control group.

GSSG was spray-applied to the leaf surface, so as to adjust the amount of GSSG-$NH_3$ salt to 0.74 mg/plant. Specifically, 0.74 mg of GSSG-$NH_3$ salt was dissolved in 24 ml of water to prepare a GSSG-containing aqueous solution, and the GSSG-containing aqueous solution was sprayed to the leaf surface using a sprayer 4 weeks after planting.

(Invention Group)

Invention group was tested through spray-application of GSSG and fertilizer elements (nitrogen, phosphorus, and potassium) to the leaf surface and treatment of soil in the same manner as in Control group. The total amount of the fertilizer elements was adjusted to the same level as employed in Comparative group 5.

GSSG and fertilizer elements were spray-applied to the leaf surface as described below. The finely-powdered water-soluble preparation (3) of the formulation F as shown in Table 8 was prepared in the same manner as with the procedure described in "2. Production of finely-powdered water-soluble preparation" described in Example 1. 2.4 mg of the finely-powdered water-soluble preparation (3) was dissolved in 24 ml of water to prepare an aqueous solution containing GSSG and fertilizer elements, and the aqueous solution containing GSSG and fertilizer elements was then spray-applied to the leaf surface using a sprayer 4 weeks after planting. 24 ml of the aqueous solution containing GSSG and fertilizer elements to be sprayed to a plant contained 2.4 mg of the finely-powdered water-soluble preparation (3), and contained 0.72 mg of GSSG (in terms of free GSSG), 0.86 mg of ammonium sulfate, 0.36 mg of ammonium phosphate, and 0.44 mg of potassium sulfate.

TABLE 8

| Formulation F | | |
|---|---|---|
| Components | Mass % | Mass (g) |
| Oxidized glutathione ammonium salt (Kaneka Corporation) | 30.8 | 30.8 |
| Ammonium sulfate (Sumitomo Chemical Co., Ltd.) | 35.8 | 35.8 |
| Monobasic ammonium phosphate (Shimonoseki Mitsui Chemicals, Inc.) | 15.0 | 15.0 |
| Potassium sulfate (MITSUI & CO., LTD.) | 18.4 | 18.4 |
| Total | 100 | 100 |

TABLE 9

| | Weight applied (mg) | Control | Comp. Ex. 5 | Comp. Ex. 6 | Invention |
|---|---|---|---|---|---|
| Leaf surface | GSSG | — | — | 0.74 | 0.74 |
| | Ammonium sulfate | — | 0.86 | — | 0.86 |
| | Ammonium phosphate | — | 0.36 | — | 0.36 |
| | Potassium sulfate | — | 0.44 | — | 0.44 |

Numerical values in the table indicate the total amount of components sprayed (unit: mg) to the leaf surface during the test period per plant. In the table, the symbol "-" indicates that application to the leaf surface or soil is not performed.

2. Results

After the tubers had matured, the tuber weights (the average per plant) of the test groups were measured, and the increase was determined.

The increase is indicated by a percentage figure of the tuber weight of the test groups relative to the tuber weight of terrestrial part in Control group (application of fertilizer components to soil).

TABLE 10

|  | Control | Comp. Ex. 5 | Comp. Ex. 6 | Invention |
|---|---|---|---|---|
| Weight (g) | 668 | 664 | 815 | 945 |
| Increase (%) | 100 | 99 | 122 | 141 |

Example 6: Effects of Spray-Application to Leaf Surface

The GSSG-containing fertilizer compositions according to one or more embodiments of the present invention with different amounts of fertilizer elements were sprayed to the leaf surface to confirm the relationship between the plant growth promotion effect and the amount of fertilizer elements.

1. Test Method

Lettuce seedlings (Green leaf lettuce, Sakata Seed Corporation) were raised under the conditions described below.
Duration: 2 Weeks
Place: Inside a plant incubator
Soil: Black soil (40 ml/pot)
Temperature: 22° C.
Light: 115 µmol $m^{-2}$ $s^{-1}$ (10,000 lux) (light period: 16 hours; dark period: 8 hours)
Pot size: 7 cm×7 cm×5 cm
Number of tested plants (n): 4
Water supply: During the seedling-raising test, water was adequately supplied so as to prevent the soil in the pot from being dehydrated (about 20 ml/week).

Test groups: Seven test groups: i.e., Control group, Comparative group 7, Formulation group 1 (15 parts of the fertilizer), Formulation group 2 (30 parts of the fertilizer), Formulation group 3 (100 parts of the fertilizer), Formulation group 4 (150 parts of the fertilizer), Formulation group 5 (200 parts of the fertilizer), and Formulation group 6 (400 parts of the fertilizer), were provided as shown in Table 11 below.

(Control Group)

Control group was tested through application of fertilizer elements (nitrogen, phosphorus, and potassium) only to soil without the application of GSSG.

In the case of Control group, soil was prepared to contain nitrogen, phosphorus, and potassium in an amount of 40 mg each (120 mg in total per pot) in terms of N, $P_2O_5$, and $K_2O$, respectively, at the time of sowing. Specifically, 40 ml of soil, 156 mg of ammonium sulfate, 66 mg of monobasic ammonium phosphate, and 80 mg of potassium sulfate were weighed and introduced into a container, these elements were mixed to prepare a homogeneous composition, and the resultant was introduced into a pot. Ammonium sulfate used in the experiment contained 21% of nitrogen (in terms of N), monobasic ammonium phosphate contained 11% of nitrogen (in terms of N) and 61% of phosphorus (in terms of $P_2O_5$), and potassium sulfate contained 50% of potassium (in terms of $K_2O$) (based on the indication of each product).

Lettuce seeds were sowed in soil in the pot and the seedling-raising test was then initiated.

(Comparative Group 7)

Comparative group 7 was tested through application of GSSG to the leaf surface and fertilizer elements (nitrogen, phosphorus, and potassium) to soil.

The method for application of fertilizer elements to soil and the amount of application were as described above with reference to Control group.

GSSG was applied to soil with the addition of an aqueous solution of GSSG to soil. At the outset, an aqueous solution of GSSG (in terms of free GSSG, the same applies hereinbelow) dissolved at 300 ppm in water was prepared. Subsequently, the aqueous solution of GSSG was applied in an amount of 4 ml each (12 ml in total) three separate times at intervals of 3 days from 6 days after seedling raising was initiated. Thus, 3.6 mg of GSSG (in terms of free GSSG) would be applied during the test period per pot.

(Formulation Groups 1 to 6)

Formulation groups 1 to 6 were tested through spray-application of GSSG and a part of the fertilizer elements (nitrogen, phosphorus, and potassium) to the leaf surface and application of the other part of the fertilizer elements to soil. The total amount of the fertilizer elements was adjusted to the same level as employed in other test groups.

In Formulation groups 1 to 6, as fertilizer elements, ammonium sulfate, ammonium phosphate, and potassium sulfate were weighed in amounts shown in Table 11 below and introduced into a container, these elements were mixed to prepare a homogeneous composition, and the resultant was then introduced into a pot.

GSSG was spray-applied to the leaf surface as described below. The finely-powdered water-soluble preparation was prepared in accordance with the process of preparation in accordance with FIG. 1 by weighing oxidized glutathione ammonium salt, ammonium sulfate, ammonium phosphate, and potassium sulfate in accordance with the process shown in FIG. 11. The finely-powdered water-soluble preparation was suspended and dissolved in 12 ml of water to prepare an aqueous solution containing GSSG and fertilizer elements. Subsequently, the aqueous solution containing GSSG and fertilizer elements was sprayed in an amount of 4 ml each (12 ml in total) to the leaf surface of the seedling three separate times at intervals of 3 days from 6 days after seedling raising was initiated in each pot.

TABLE 11

| | Weight applied (mg) | Control | Comp. Ex. 7 (0 parts of fertilizer) | Formulation 1 (15 parts of fertilizer) | Formulation 2 (30 parts of fertilizer) | Formulation 3 (100 parts of fertilizer) | Formulation 4 (150 parts of fertilizer) | Formulation 5 (200 parts of fertilizer) | Formulation 6 (400 parts of fertilizer) |
|---|---|---|---|---|---|---|---|---|---|
| Leaf surface | GSSG | — | 3.5 | 3.5 | 3.5 | 3.5 | 3.5 | 3.5 | 3.5 |
| | Ammonium sulfate | — | — | — | 2.1 | 1.6 | 13.7 | 20.5 | 27.3 | 54.5 |
| | Ammonium phosphate | — | — | — | 0.9 | 1.7 | 5.7 | 8.6 | 11.5 | 23.0 |
| | Potassium sulfate | — | — | — | 1.1 | 2.1 | 7.0 | 10.5 | 14.0 | 28.0 |
| Soil | Ammonium sulfate | 156.0 | 155.0 | 154.0 | 154.4 | 142.4 | 135.5 | 128.7 | 101.5 |
| | Ammonium phosphate | 66.0 | 66.0 | 65.1 | 64.3 | 60.3 | 57.4 | 54.5 | 43.1 |
| | Potassium sulfate | 80.0 | 80.0 | 79.0 | 77.9 | 73.0 | 69.5 | 66.0 | 52.0 |

Numerical values in the table indicate the total amount of components sprayed (unit: mg) to the leaf surface or applied to soil during the test period per pot. In the table, the symbol "-" indicates that application to the leaf surface or soil is not performed. The amount of the fertilizer is indicated in terms of parts of fertilizer elements by mass relative to 100 parts by mass of GSSG.

2. Results

Two weeks after the completion of the test period, the fresh weight (the average) of the terrestrial parts of the plants of the test groups was measured to determine the growth rate.

The growth rate is indicated by a percentage figure of the fresh weight of the terrestrial part of the test groups relative to the fresh weight of terrestrial part of Control group (only the fertilizer elements were applied to soil).

TABLE 12

|  | Control | Comp. Ex. 7 (0 parts fertilizer) | Formulation 1 (15 parts of fertilizer) | Formulation 2 (30 parts of fertilizer) | Formulation 3 (100 parts of fertilizer) | Formulation 4 (150 parts of fertilizer) | Formulation 5 (200 parts of fertilizer) | Formulation 6 (400 parts of fertilizer) |
| --- | --- | --- | --- | --- | --- | --- | --- | --- |
| Weight (mg) | 67 | 88 | 99 | 149 | 198 | 188 | 174 | 108 |
| Growth rate (%) | 100 | 131 | 148 | 222 | 296 | 280 | 260 | 160 |

3. Discussion

The results of comparison between Control group and Comparative group 7 demonstrate that plant growth is promoted via application of GSSG.

As a result of comparison between Formulation groups 1 to 6 and Comparative group 7, an extent of plant growth promoted via spray-application of GSSG and a part of the fertilizer elements to the leaf surface was found to be greater than that promoted via spray-application of GSSG to the leaf surface and application of the fertilizer elements only to soil. It was also found that the effects were significant in some ranges.

The growth rate observed in Formulation group 1 was approximately 1.13 times greater than that observed in Comparative group 7. The growth rate observed in Formulation group 2 was approximately 1.69 times greater than that observed in Comparative group 7. It was thus found that the growth rate would be approximately 1.69 to 2.14 times greater compared with Comparative group 7 when the amount of the fertilizer element was 30 parts or more relative to 100 parts of GSSG. That is, synergistic effects of plant growth promotion are attained via spray-application of GSSG and fertilizer elements to the leaf surface.

Meanwhile, failure of growth was observed in 1 of 4 test plants in Formulation test groups 6 and 7. Thus, the amount of the fertilizer elements, 150 parts or less relative to 100 parts of GSSG, may be applied to the leaf surface together with GSSG.

All publications, patents, and patent applications cited herein are incorporated herein by reference in their entirety.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method for cultivating a plant, comprising applying 100 parts by mass of oxidized glutathione calculated as a free form,
   10 to 150 parts by mass of a nitrogen source calculated as elemental nitrogen,
   10 to 150 parts by mass of a phosphorus source calculated as $P_2O_5$, and
   10 to 150 parts by mass of a potassium source calculated as $K_2O$ to leaves of the plant.

2. The method according to claim 1, wherein applying the oxidized glutathione, the nitrogen source, the phosphorus source, and the potassium source is performed by applying a fertilizer composition to the leaves, wherein
   the fertilizer composition comprises the oxidized glutathione, the nitrogen source, the phosphorus source, and the potassium source, and exhibits a pH value of 2.0 to 6.5 when 3 g of the fertilizer composition is dispersed in 100 ml of distilled water at 25° C. or a diluent of the fertilizer composition.

3. The method according to claim 1, wherein
   at least 0.01 mg of the oxidized glutathione calculated as a free form,
   at least 0.01 mg of the nitrogen source calculated as elemental nitrogen,
   at least 0.01 mg of the phosphorus source calculated as $P_2O_5$, and
   at least 0.01 mg of the potassium source calculated as $K_2O$ are applied to the plant.

4. The method according to claim 1, wherein
   0.1 to 100 mg of the oxidized glutathione calculated as a free form,
   0.1 to 100 mg of the nitrogen source calculated as elemental nitrogen,
   0.1 to 100 mg of the phosphorus source calculated as $P_2O_5$, and
   0.1 to 100 mg of the potassium source calculated as $K_2O$ are applied to the plant.

5. The method according to claim 1, wherein
   the nitrogen source is selected from the group consisting of ammonium sulfate, ammonium nitrate, ammonium chloride, urea, and lime nitrogen,
   the phosphorus source is selected from the group consisting of ammonium phosphate, potassium phosphate, superphosphate, triple superphosphate, fused phosphate fertilizer, multi-phosphate fertilizer, and phosphorous acid, and
   the potassium source is selected from the group consisting of potassium sulfate, potassium chloride, and potassium bicarbonate.

\* \* \* \* \*